United States Patent
Schwartz

(10) Patent No.: US 7,100,036 B2
(45) Date of Patent: Aug. 29, 2006

(54) SYSTEM AND METHOD FOR SECURING A COMPUTER

(75) Inventor: Jeffrey D. Schwartz, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 885 days.

(21) Appl. No.: 09/999,466

(22) Filed: Oct. 30, 2001

(65) Prior Publication Data

US 2003/0084316 A1    May 1, 2003

(51) Int. Cl.
*G06F 21/02* (2006.01)
*G06F 7/02* (2006.01)

(52) U.S. Cl. .................. 713/2; 713/1; 726/34

(58) Field of Classification Search ........ 713/200
See application file for complete search history.

(56) References Cited

U.S. PATENT DOCUMENTS

| | | | |
|---|---|---|---|
| 5,745,568 A * | 4/1998 | O'Connor et al. ......... 705/56 |
| 5,909,592 A * | 6/1999 | Shipman ................... 710/10 |
| 6,161,177 A | 12/2000 | Anderson | |
| 6,484,308 B1 | 11/2002 | Pearce et al. | |
| 2002/0073328 A1 | 6/2002 | Daniels et al. | |

FOREIGN PATENT DOCUMENTS

| | | |
|---|---|---|
| EP | 0773490 A1 | 5/1997 |
| EP | 1211681 A1 | 6/2002 |

* cited by examiner

*Primary Examiner*—Gilberto Barron, Jr.
*Assistant Examiner*—Venkat Perungavoor

(57) ABSTRACT

A computer security system comprises a motherboard comprising a processor and a memory. The system also comprises a drive device having an assigned identifier and coupled to the motherboard. The system further comprises a basic input/output system (BIOS) executable by the processor and adapted to compare the assigned identifier of the drive device with an identifier stored in the memory and boot the motherboard if the assigned identifier corresponds to the stored identifier.

20 Claims, 2 Drawing Sheets

SYSTEM AND METHOD FOR SECURING A COMPUTER

CROSS-REFERENCE TO RELATED APPLICATION

This patent application is related to co-pending U.S. patent application Ser. No. 09/998,888, entitled "APPLIANCE SECURITY MODEL SYSTEM AND METHOD," filed Oct. 30, 2001, co-assigned herewith, and co-pending U.S. patent application Ser. No. 09/999,123, entitled "SECURE BOOT DEVICE SELECTION METHOD AND SYSTEM," filed Oct. 30, 2001, co-assigned herewith.

TECHNICAL FIELD OF THE INVENTION

The present invention relates generally to the field of computer processing systems and, more particularly, to a system and method for securing a computer.

BACKGROUND OF THE INVENTION

Securing the configuration and data of computer systems remains an important issue to both system users and manufacturers. For example, computer systems generally comprise a motherboard having a processor, memory, and other functional components. The system also generally comprises a hard drive for storing data such as word processing documents, audio files, video files, and other types of data. Security systems generally restrict access to the data so that only authorized users may open or view protected data. For example, passwords or other user-provided security codes may be used to protect the data from unauthorized access.

As computer systems became increasingly sophisticated, the systems were equipped with BIOS-(basic input/output system) based passwords. A BIOS-based password program runs before control of the computer is given to any drive-based software application. Access to data contained on the hard drive generally requires BIOS-based encryption keys and/or passwords. Thus, by removing the hard drive and connecting the hard drive to another processing system, access to the hard drive is substantially prevented. However, if the BIOS-based encryption keys and/or passwords are copied or retrieved from the BIOS by an unauthorized user, access to the hard drive by the unauthorized user may be possible. Additionally, user modifications to the system oftentimes result in unpredictable service and troubleshooting issues.

SUMMARY OF THE INVENTION

In accordance with one embodiment of the present invention, a computer security system comprises a motherboard comprising a processor and a memory. The system also comprises a drive device having an assigned identifier and coupled to the motherboard. The system further comprises a basic input/output system (BIOS) executable by the processor. The BIOS is adapted to compare the assigned identifier with an identifier stored in the memory and boot the drive device if the assigned identifier corresponds with the stored identifier.

In accordance with another embodiment of the present invention, a method for securing a computer system comprises automatically polling a drive device to determine an assigned identifier associated with the drive device. The method also comprises comparing the assigned identifier to an identifier stored in a memory of a motherboard. The method further comprises booting the drive device if the assigned identifier corresponds to the stored identifier.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
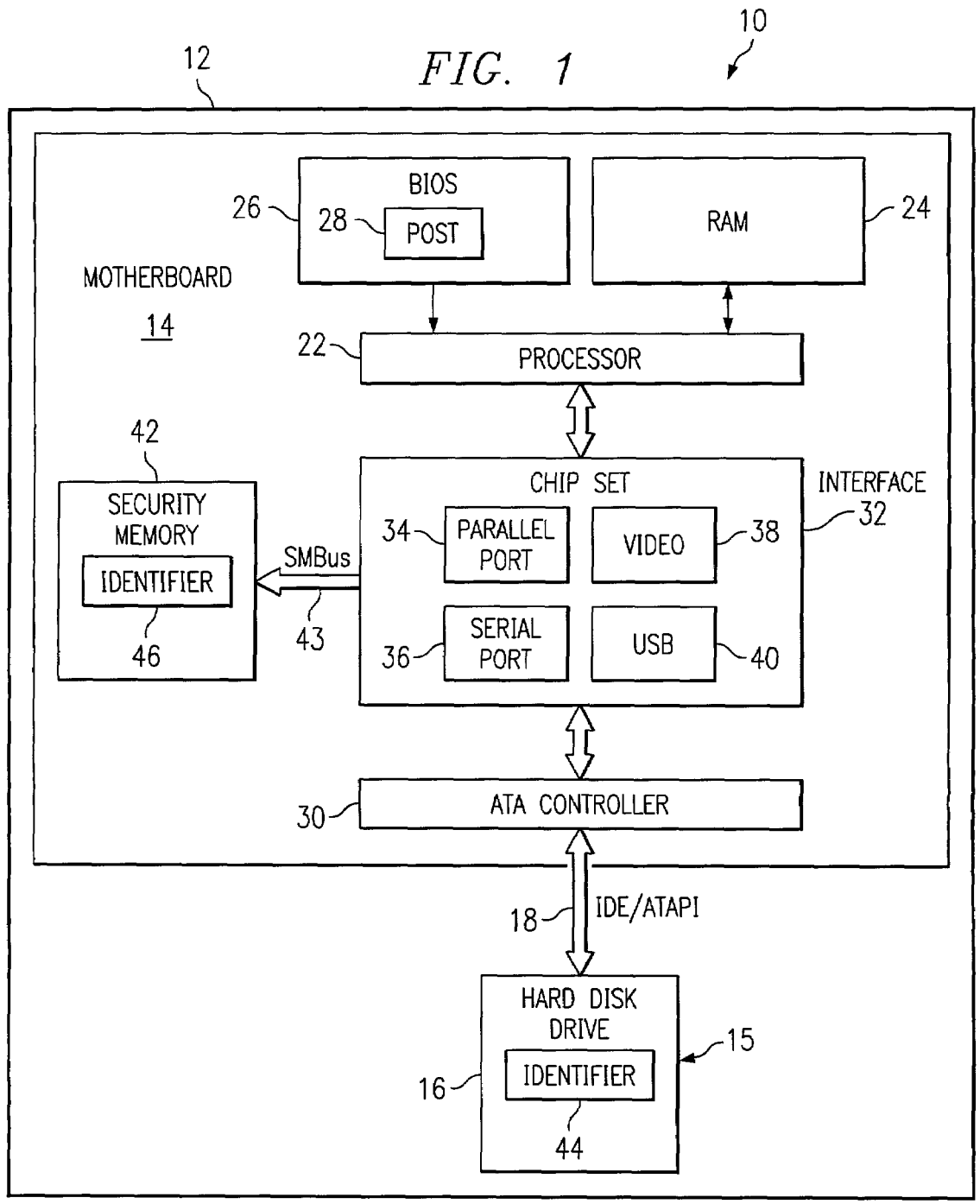
FIG. 1 is a diagram illustrating a computer security system in accordance with an embodiment of the present invention.
Figure 2:
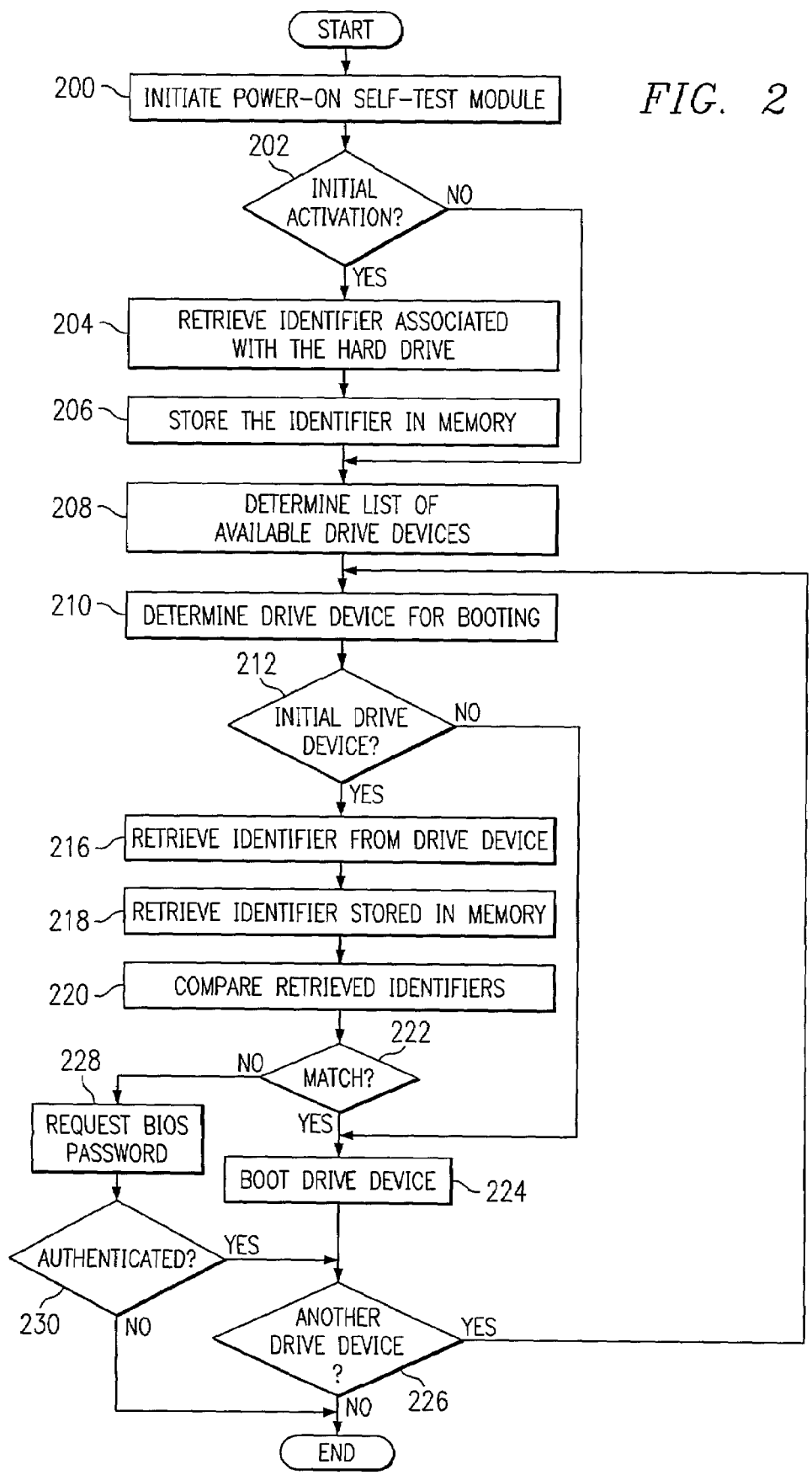
FIG. 2 is a flow chart illustrating a method for securing a computer system in accordance with an embodiment of the present invention.

The preferred embodiments of the present invention and the advantages thereof are best understood by referring to FIGS. 1 and 2 of the drawings, like numerals being used for like and corresponding parts of the various drawings.

FIG. 1 is a diagram illustrating a computer security system 10 in accordance with an embodiment of the present invention. In FIG. 1, a configuration of various computer-related components that may be found in a representative computer-type device is illustrated. However, many other representative configurations may exist. In the illustrated embodiment, system 10 comprises an Internet appliance 12, such as a hand-held or stationary device for accessing the Internet; however, the present invention may also be used with other devices including, without limitation, desktop PCs, notebook computers, personal digital assistants, and any other processing devices that have a basic input/output system (BIOS) or equivalent.

The appliance 12 illustrated in FIG. 1 comprises a motherboard 14 coupled to a drive device 15. In the illustrated embodiment, the drive device 15 comprises a hard disk drive 16; however, it should be understood that other types of drive devices 15 may be coupled to motherboard 14, including, but not limited to, floppy disk drives, magnetic tape drives, flash drives and optical media drives. The drive device 15 is coupled to motherboard 14 in the illustrated embodiment via an integrated device electronics/advanced technology attachment packet interface (IDE/ATAPI) bus 18 for reading or storing data corresponding to drive device 15. For example, hard disk 16 may comprise an operating system and various other application modules or routines.

In the illustrated embodiment, motherboard 14 comprises a processor 22, random access memory (RAM) 24, and a basic input/output system (BIOS) 26. The BIOS 26 is preferably implemented in flash memory and comprises a power-on self-test module 28 for performing system initialization and tests. Motherboard 14 also comprises a hard drive controller 30 for interfacing with hard drive 16. Input/output devices such as, but not limited to, a mouse, keyboard, display device, scanner, or printer (not explicitly shown) communicate with motherboard 14 via an interface chip set 32. For example, interface chip set 32 may communicate with the various input/output devices via a parallel port 34, a serial port 36, a video port 38, and a universal serial bus (USB) 40. Motherboard 14 illustrated in FIG. 1 also comprises a security memory 42, preferably implemented as flash memory, comprising a variety of types of security information associated with system 10 and accessible via a serial bus 43.

Briefly, an identifier 44, such as a serial number, password, or other type of identifying number and/or code, associated with hard drive 16 is stored in memory 42 as an identifier 46. Identifier 46 may be preprogrammed into memory 42, or identifier 46 may be retrieved from hard drive 16 and stored in memory 42 during an initial booting operation of system 10. During execution of the power-on self-test module 28, BIOS 26 compares identifier 46 with identifier 44 of hard drive 16 to verify system 10 configuration. If identifiers 44 and 46 match, BIOS 26 proceeds to boot hard drive 16 and, for example, load an operating system or other software application. If identifiers 44 and 46 do not match, BIOS 26 does not boot hard drive 16, thereby maintaining motherboard 14 in a "locked" configuration. Accordingly, the motherboard 14 storing identifier 46 is "locked" to hard drive 16 having identifier 44 such that the predetermined configuration of motherboard 14 and hard drive 16 maintains an operationally-secure system 10.

In operation, activation of system 10 preferably begins when processor 22 exits the reset stage and begins operating at address 0. At address 0, processor 22 accesses BIOS 26 and shadows the instructions of BIOS 26, such as power-on self-test module 28, into RAM 24. Processor 22 then executes power-on self-test module 28 from RAM 24. During execution of power-on self-test module 28, processor 22 begins attempting to boot the drive storage devices for booting an operating system. For example, during power-on self-test module 28 execution, a list of available drive devices coupled to motherboard 14 may be compiled. Although each drive device may contain a different operating system each capable of booting, generally, only the drive devices in the bootable drive list maintained by BIOS 26 that have a default setting and are user configurable may be selected to boot. Accordingly, system 10 will generally attempt boot the drive devices in the order appearing on the list; however, parameters may also be stored in BIOS 26 indicating which drive device to boot first.

During execution of power-on self-test module 28, a boot is attempted for the designated drive device. If booting the drive device fails, BIOS 26 may prompt the user for a password before attempting to boot the remaining drive devices on the list. For example, a particular password associated with the drive device may be stored in memory 42 and retrieved from memory 42 while attempting to boot the designated drive device. A boot is attempted for each drive device on the list until a boot is successful.

As briefly described above, hard drive 16 comprises an identifier 44 that may be either preprogrammed or stored in memory 42 as identifier 46 prior to initial activation of system 10 or stored in memory 42 during the initial activation of system 10. For example, BIOS 26 may be configured such that identifier 44 corresponding to hard drive 16 is retrieved the first time system 10 is activated and stored in memory 42 as identifier 46. During execution of power-on self-test module 28, booting of hard drive 16 is attempted. During the attempted boot of hard drive 16, processor 22 polls hard drive 16 and retrieves identifier 44 from hard drive 16 and compares identifier 44 with identifier 46 stored in memory 42. If identifiers 44 and 46 match, hard drive 16 is booted. If identifiers 44 and 46 do not match, hard drive 16 is not booted, and the procedure of booting any remaining drive devices on the generated list of available drive devices is continued once a BIOS 26 password is supplied. Additionally, processor 22 may be adapted to generate an alert on a display or other type of output device (not explicitly shown) indicating that identifiers 44 and 46 do not correspond with each other.

Thus, embodiments of the present invention restrict booting of drive device 15 to the particular motherboard 14 comprising an identifier 46 matching the identifier 44 corresponding to the drive device 15, thereby "locking" motherboard 14 to a particular drive device 15. Accordingly, the configuration of system 10 remains secure because drive device 15 may not be removed and replaced with another drive device—any serial number or identifier of the replacement drive device will not match identifier 46 stored in memory 42. Additionally, because a boot of any replacement drive device will be unsuccessful, access to memory 42 in an attempt to retrieve identifier 46 is substantially prevented.

FIG. 2 is a flow chart illustrating a method for securing a system 10 in accordance with an embodiment of the present invention. The method begins at step 200, where processor 22 executes power-on self-test module 28. At decisional step 202, a determination is made whether the current system 10 activation is an initial activation or initial execution of power-on self-test module 28. If the current activation is the initial activation, the method proceeds from step 202 to step 204, where identifier 44 associated with drive device 15 is retrieved from drive device 15. At step 206, identifier 44 retrieved from drive device 15 is stored in memory 42 as identifier 46. If the current activation is not the initial activation of power-on self-test module 28, the method proceeds from step 202 to step 208.

At step 208, processor 22 determines a listing of available drive devices in accordance with power-on self-test module 28 instructions. At step 210, processor 22 determines which of the listed drive devices should be selected first for booting. For example, as briefly described above, the instructions for booting the various drive devices may comprise a particular order or may comprise that particular drive devices be booted first. At decisional step 212, a determination is made whether the selected drive device is the initial drive device for an attempted booting, such as, for example, drive device 15. If the selected drive device is not the initial drive device, the method proceeds from step 212 to step 224, where processor 22 attempts to boot the selected drive device. The method then proceeds to step 226.

If the selected drive device is the initial drive device selected for an attempted boot, the method proceeds from step 212 to step 216, where processor 22 polls the drive device for an identifier. For example, if the selected drive device comprises drive device 15, processor retrieves identifier 44 corresponding to drive device 15. At step 218, processor 22 retrieves identifier 46 stored in memory 42. At step 220, processor 22 compares identifier 44 with identifier 46.

At decisional step 222, a determination is made whether identifier 44 matches or corresponds to identifier 46 stored in memory 42. If identifier 44 corresponds to identifier 46, the method proceeds from step 222 to step 224, where processor 22 boots the drive device. If identifier 44 does not correspond to identifier 46 stored in memory 42, the method proceeds from step 222 to step 228. At step 228, processor 22 prompts or requests from the user of system 10 a password associated with BIOS 26 for accessing security and configuration settings associated with system 10. At decisional step 230, a determination is made whether the password associated with BIOS 26 has been authenticated. If the password associated with BIOS 26 has been authenticated, the method proceeds from step 230 to step 226. If the password associated with BIOS 26 has not been authenticated, the method ends.

At decisional step 226, a determination is made whether another drive device requires booting. If another drive device requires booting, the method returns to step 210. If another drive device does not require booting, the method ends, thereby completing execution of power-on self-test module 28 or providing for the continued execution of power-on self-test module 28.

Thus, the present invention provides greater system 10 security than prior security systems by substantially preventing booting of drive device 15 if drive device 15 not an originally-configured drive device 15 of system 10. Additionally, the present invention provides for more predictable system 10 service or diagnostic evaluation because the user of the system 10 is substantially prevented from altering system 10. Further, the present invention provides for increased control of protected or sensitive information that may be stored on drive device 15.

What is claimed is:

1. A computer security system, comprising:
   a motherboard comprising a processor and a memory;
   a drive device having an assigned identifier and coupled to the motherboard; and
   a basic input/output system (BIOS) executable by the processor and adapted to compare the assigned identifier of the drive device with an identifier stored in the memory and boot the drive device if the assigned identifier corresponds to the stored identifier.

2. The security system of claim 1, wherein the memory comprises a serial flash memory.

3. The security system of claim 1, wherein the assigned identifier is stored in the memory during an initial power-on self-test module operation.

4. The security system of claim 1, wherein the processor generates an alert if the assigned identifier is different from the stored identifier.

5. The security system of claim 1, wherein the computer security system is disposed on an Internet appliance.

6. The security system of claim 1, wherein the BIOS is adapted to compare the stored identifier with the assigned identifier during a power-on self-test operation.

7. The security system of claim 1, wherein the BIOS is further adapted to determine if a current activation of the system is an initial activation of the system and store the assigned identifier in the memory if the current activation is the initial activation.

8. A method for securing a computer system, comprising:
   automatically polling a drive device to determine an assigned identifier associated with the drive device;
   comparing the assigned identifier to an identifier stored in a memory of a motherboard; and
   booting the drive device if the assigned identifier corresponds with the stored identifier.

9. The method of claim 8, wherein comparing comprises comparing the assigned identifier to an identifier stored in a serial flash memory.

10. The method of claim 8, wherein automatically polling a drive device comprises automatically polling a hard drive via a basic input/output system (BIOS), the BIOS adapted to retrieve the stored identifier from the memory.

11. The method of claim 8, further comprising generating an alert if the stored identifier is different from the assigned identifier.

12. The method of claim 8, further comprising storing the assigned identifier associated with the drive device in the memory during an initial power-on self-test operation.

13. The method of claim 12, wherein automatically polling comprises automatically polling the drive device during each subsequent power-on self-test operation.

14. The method of claim 8, wherein automatically polling comprises automatically polling a drive device during a power-on self-test operation.

15. A method for securing a computer system, comprising:
    providing a drive device having an identifier;
    providing a motherboard having a processor and a memory;
    storing the identifier in the memory; and
    providing a basic input/output system (BIOS) adapted to poll the drive device to retrieve the identifier and boot the drive device if the retrieved identifier matches the identifier stored in the memory.

16. The method of claim 15, further comprising generating an alert if the retrieved identifier is different from the stored identifier.

17. The method of claim 15, wherein providing a motherboard comprises providing a motherboard having a serial flash memory, and wherein storing comprises storing the identifier in the serial flash memory.

18. The method of claim 15, wherein providing the BIOS further comprises providing the BIOS adapted to poll the drive device during a power-on self-test operation.

19. The method of claim 15, wherein storing the identifier comprises storing the identifier in the memory during an initial power-on self-test operation.

20. The method of claim 19, wherein providing the BIOS further comprises providing the BIOS adapted to poll the drive device during each subsequent power-on self-test operation.

* * * * *